United States Patent
Avrilingi et al.

(10) Patent No.: US 10,496,402 B1
(45) Date of Patent: Dec. 3, 2019

(54) SYSTEM, METHOD, AND COMPUTER PROGRAM FOR DEFINING AND UTILIZING MINIMAL TESTABLE VALUES FOR SOFTWARE PROJECT DEVELOPMENT AND OPERATIONS

(71) Applicant: Amdocs Development Limited, Limassol (CY)

(72) Inventors: Dror Avrilingi, Modiin (IL); Sharon Elgarat, Kibbutz Mefalsim (IL)

(73) Assignee: AMDOCS DEVELOPMENT LIMITED, Limassol (CY)

(*) Notice: Subject to any disclaimer, the term of this patent is extended or adjusted under 35 U.S.C. 154(b) by 0 days.

(21) Appl. No.: 15/719,417

(22) Filed: Sep. 28, 2017

(51) Int. Cl.
    *G06F 8/77*     (2018.01)
    *G06Q 10/06*     (2012.01)
    *G06F 11/36*     (2006.01)

(52) U.S. Cl.
    CPC ............ *G06F 8/77* (2013.01); *G06F 11/3616* (2013.01); *G06Q 10/0633* (2013.01)

(58) Field of Classification Search
    CPC ................... G06F 8/00–78; G06F 11/36–3696
    See application file for complete search history.

(56) References Cited

U.S. PATENT DOCUMENTS

| | | | |
|---|---|---|---|
| 6,330,692 B1* | 12/2001 | Kamuro | G06F 11/3676 |
| | | | 712/236 |
| 8,381,197 B2 | 2/2013 | Meenakshisundaram et al. | |
| 8,806,423 B2 | 8/2014 | Wefers et al. | |
| 8,819,617 B1* | 8/2014 | Koenig | G06F 8/70 |
| | | | 717/101 |
| 8,972,951 B2 | 3/2015 | Hadar | |
| 9,098,661 B1* | 8/2015 | Biswas | G06F 17/5045 |
| 9,262,126 B2 | 2/2016 | Ghaisas | |
| 9,262,308 B2* | 2/2016 | Dwarakanath | G06F 11/3608 |

(Continued)

FOREIGN PATENT DOCUMENTS

WO      2015083178 A1      6/2015

OTHER PUBLICATIONS

The Agile Times, "http://theagiletimes.com/6-main-reasons-must-identify-backlog-item-dependencies/", Published Apr. 24, 2016, http://theagiletimes.com/6-main-reasons-must-identify-backlog-item-dependencies/.*

(Continued)

*Primary Examiner* — Geoffrey R St Leger
*Assistant Examiner* — Joanne G Macasiano
(74) *Attorney, Agent, or Firm* — Zilka-Kotab, P.C.

(57) ABSTRACT

A system, method, and computer program product are provided for defining and utilizing minimal testable values for software project development and operations. In operation, a system identifies a software development project. The system defines an initial list of minimal testable values (MTVs) as part of a backlog definition stage associated with a project backlog corresponding to the software development project. The system links the MTVs to the project backlog. The system confirms the MTVs as part of a backlog confirmation stage associated with the software development project. Further, the system maintains the MTVs during a backlog grooming stage associated with the software development project. Moreover, the system certifies the MTVs after each delivery of software associated with the software development project.

11 Claims, 7 Drawing Sheets

(56) References Cited

U.S. PATENT DOCUMENTS

| | | | |
|---|---|---|---|
| 2005/0246207 A1* | 11/2005 | Noonan | G06F 11/3409 |
| | | | 705/4 |
| 2011/0066490 A1* | 3/2011 | Bassin | G06Q 10/06 |
| | | | 705/14.48 |
| 2012/0167036 A1* | 6/2012 | Tanaka | G06F 8/452 |
| | | | 717/106 |
| 2014/0096109 A1 | 4/2014 | Beno et al. | |
| 2017/0147481 A1* | 5/2017 | Doss | G06F 11/3684 |

OTHER PUBLICATIONS

Ben Moore, "Agile Software Development—Minimum Testable Features", Published May 23, 2017, https://by.dialexa.com/minimum-testable-features-a-different-approach-to-agile-software-development, Retrieved Aug. 1, 2019 (Year: 2017).*

Gottesdiener et al., "Backlog Refinement Takes You from Vision to Value", Published Sep. 9, 2016, https://www.ebgconsulting.com/blog/backlog-refinement-takes-you-from-vision-to-value/, Retrieved Aug. 1, 2019 (Year: 2016).*

* cited by examiner

SYSTEM, METHOD, AND COMPUTER PROGRAM FOR DEFINING AND UTILIZING MINIMAL TESTABLE VALUES FOR SOFTWARE PROJECT DEVELOPMENT AND OPERATIONS

FIELD OF THE INVENTION

The present invention relates to software projects, and more particularly to defining and utilizing minimal testable values for software project development and operations.

BACKGROUND

In the context of a software development process, testing of the software has been identified as a bottleneck. Companies providing such software are required to focus on cost, quality, and time to market. Companies strive to achieve continuous deployment, continuous integration, and continuous testing to help achieve such goals. Current testing methodologies and systems fail to efficiently bring value to customers while still maintaining testable end-to-end and deployable software.

There is thus a need for addressing these and/or other issues associated with the prior art.

SUMMARY

A system, method, and computer program product are provided for defining and utilizing minimal testable values for software project development and operations. In operation, a system identifies a software development project. The system defines an initial list of minimal testable values (MTVs) as part of a backlog definition stage associated with a project backlog corresponding to the software development project. The system links the MTVs to the project backlog. The system confirms the MTVs as part of a backlog confirmation stage associated with the software development project. Further, the system maintains the MTVs during a backlog grooming stage associated with the software development project. Moreover, the system certifies the MTVs after each delivery of software associated with the software development project.

DETAILED DESCRIPTION

Figure 1:
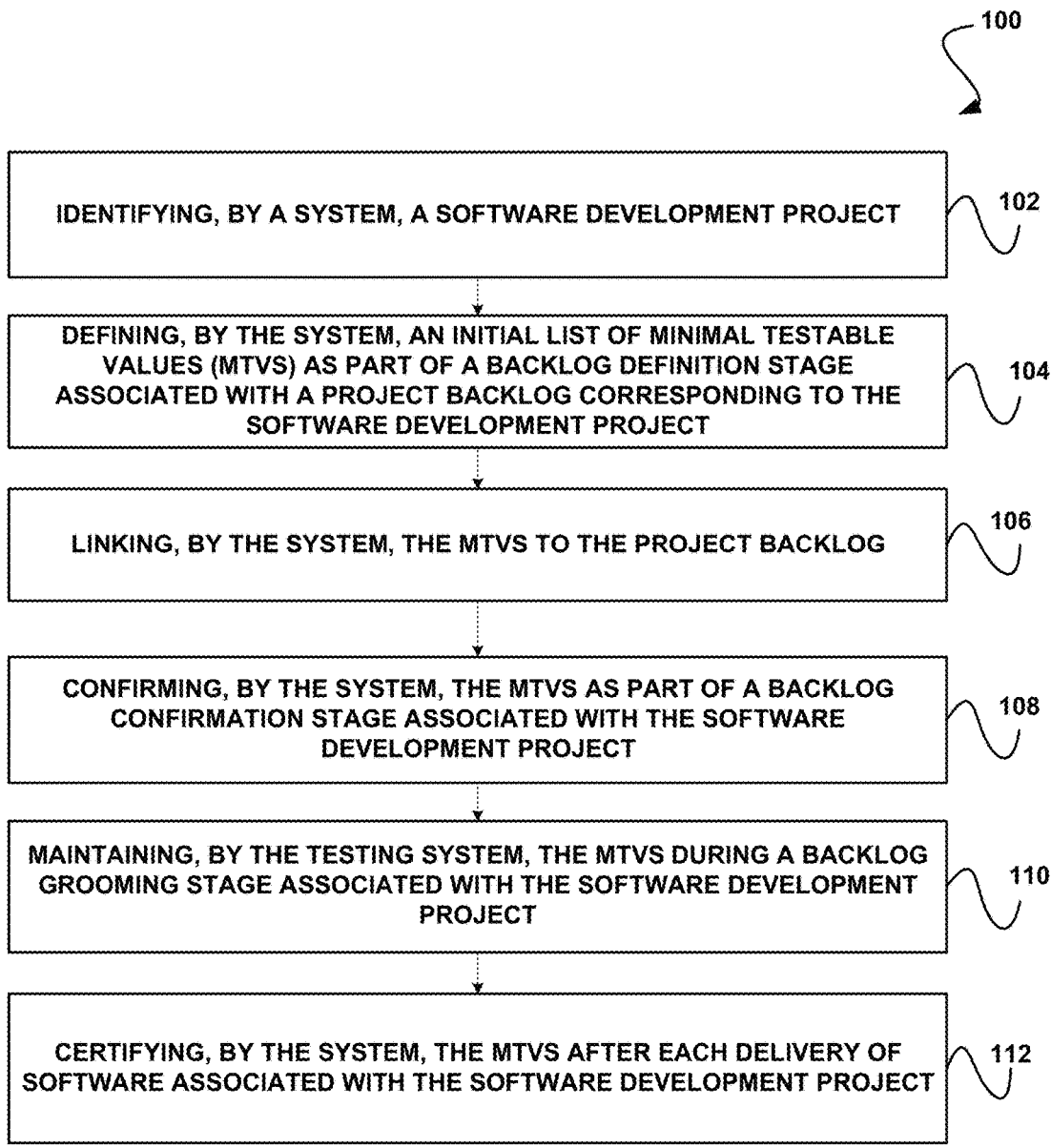
FIG. 1 illustrates a method for defining and utilizing minimal testable values (MTVs) for software project development and operations, in accordance with one embodiment.

FIG. 1 illustrates a method 100 for defining and utilizing minimal testable values for software project development and operations, in accordance with one embodiment.

In operation, a system identifies a software development project. See operation 102. The software development project may be associated with any industry. For example, in one embodiment, the software development project may be associated with the telecommunications industry. The software development project may include testing of one or more applications, computer code, and/or software packages, etc. In one embodiment, the system may identify the software development project based on user input (e.g. user input utilizing a user interface associated with the system, etc.).

The system defines an initial list of minimal testable values (MTVs) as part of a backlog definition stage associated with a project backlog corresponding to the software development project. See operation 104. In one embodiment, the system may receive information associated with a scope of the software development project. Given this scope, the system may examine the scope for business processes. The system may then defines a critical path in the business processes as a first MTV. Additional MTVs may then be defined by the system and associated with the first MTV. The system may also identify and define dependencies between the MTVs. To accomplish this, the system may organize the MTVs based on the business process (or group of processes that carry one combined value).

A minimal testable value refers to any entity defined by a system during scoping that describes an integrated scope element that must be received in order to certify a scope associated with the software development project. MTVs are defined by the system as entities that have business value and that support end-to-end tests. Each MTV, if certified, provides additional business value with well-defined boundaries.

A project backlog refers to a list of features or technical tasks that is maintained and which, at a given moment, are known to be necessary and sufficient to complete the software development project.

The system links the MTVs to the project backlog. See operation 106. In one embodiment, the system may utilize historical information and rules (e.g. collected from development experts and solution architects/managers who scan business processes, previous projects, any logged backlog item, machine learning, etc.) to customize the software based on the business process needs of the customer.

The system confirms the MTVs as part of a backlog confirmation stage associated with the software development project. See operation 108. In one embodiment, the system may generate one or more documents including information associated with the MTVs for display or production. In this case, in one embodiment, a user may be requested to confirm the MTVs (e.g. utilizing a user interface associated with the system, etc.).

Further, the system maintains the MTVs during a backlog grooming stage associated with the software development project. See operation 110. Backlog grooming refers to a period when a system or product owner and some, or all, of the rest of a testing team review items on the backlog to ensure the backlog contains the appropriate items, that they are prioritized, and that the items at the top of the backlog are ready for delivery. Thus, during the backlog grooming stage, the system ensures the list of MTVs are maintained appropriately. Moreover, the system certifies the MTVs after each delivery of software associated with the software development project. See operation 112.

Utilizing the method 100, testing activities may be performed in parallel at all test levels, certifying in each stage the scope of MTVs separately and moving them up to the next stage of testing. The certification may be performed at the MTV level, allowing the customer to make the final decision of whether to approve the certified MTVs for production or to wait for an additional scope in the next delivered MTVs.

In one embodiment, the method 100 may be employed as a DevOps practice that extends TDD (test driven development as development approach) and BDD (behavior driven development to capture end-user value) into an end-to-end program practice that creates an assembly line, allowing a backlog to meet development velocity (TDD), testable end-to-end with customer value (BDD), which can be deployed to production independently, while allowing customer value and customer transparency and clear decision making as to what goes into production.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
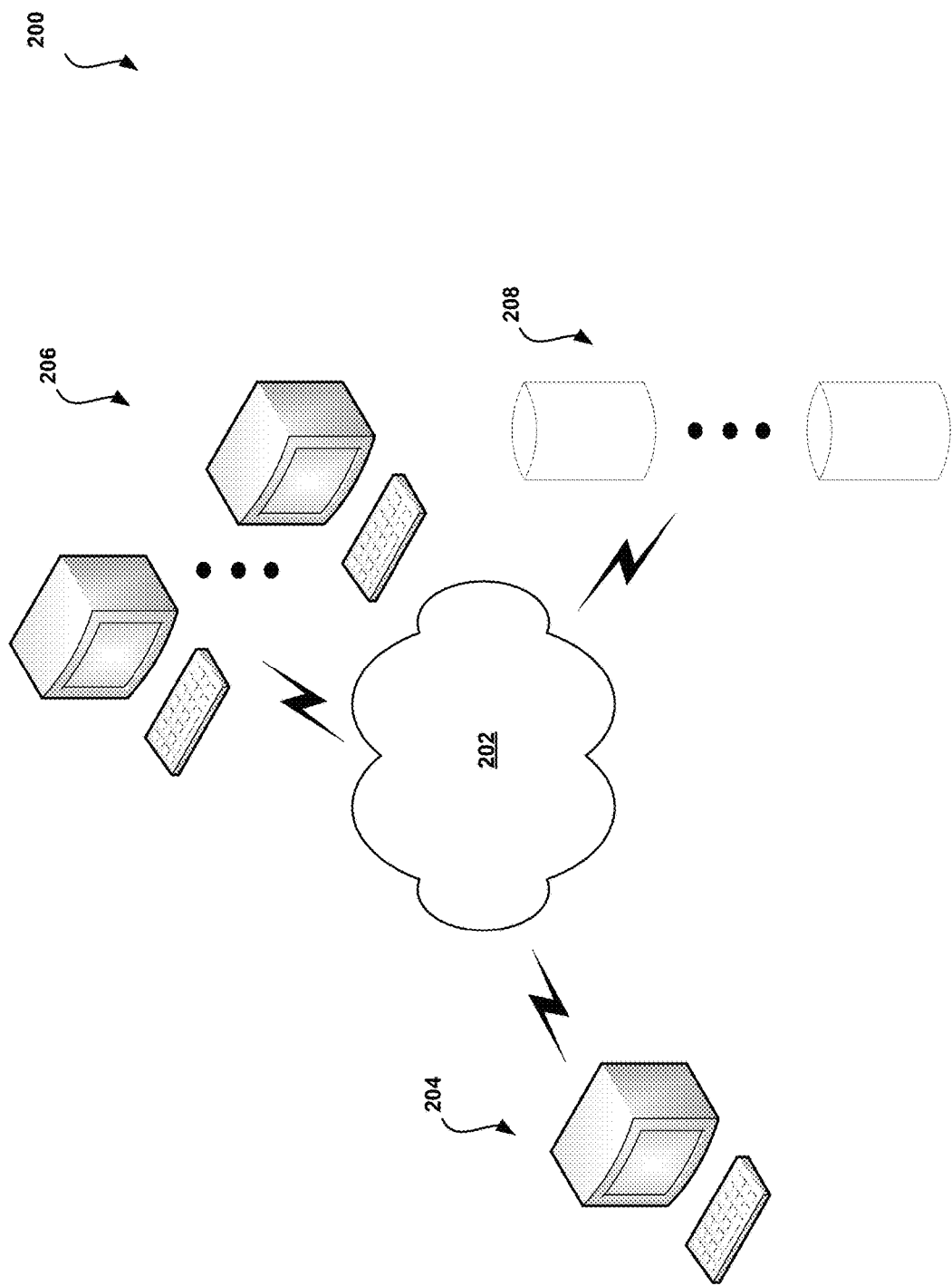
FIG. 2 shows a system for defining and utilizing MTVs for software project development and operations, in accordance with one embodiment.

FIG. 2 shows a system 200 for defining and utilizing minimal testable values for software project development and operations, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a system 204, which may implement a variety of applications or software, etc. The system 204 may be capable of communicating with a plurality of systems 206, either directly or over one or more networks 202, for defining and maintaining minimal testable values (MTVs) associated with testing projects. The system 204 may also be in communication with one or more repositories/databases 208.

In operation, the system 204 may automatically define an initial list of MTVs as part of a backlog definition stage associated with a software development project. To accomplish this, the system 204 scans the business process of a customer. If the outcome of a single business process does not produce value on its own, the system 204 may join additional business processes until a standalone value can be provided by a flow that the joined business processes represent. The new flows generated by the combination of business processes will be utilized and referred to as the business process.

The system 204 identifies the critical path in the business process. In one embodiment, this critical path may include only mandatory actions, and a selection of the simplest option in each parameter in the flow. The system 204 may have access to historical data and rules (e.g. stored in the repositories/databases 208, etc.) for identifying the critical path.

The system 204 defines the critical path as MTV#1. The system 204 also identifies and marks any decision point that generates a fork in the business process. The system 204 defines each path produced from a fork option in the business process as added MTV groups.

Further, the system 204 identifies and marks any parameter (e.g. which may be a data parameter or may be an optional functional activity, etc.) that produces a change in the outcome of the business process. The system 204 assigns each parameter to an MTV group if the parameter impacts an activity in the path of the MTV group.

The system 204 defines as a value of a parameter each option in the parameter that produces a unique outcome for the business process a comparison to the other values already defined. The system 204 identifies any relationship between parameters. This may include values in one parameter that can only be used if another value or group of values are used in another parameter. For each MTV group, the system 204 defines a new MTV to cover each value of a parameter once.

The system 204 then identifies and defines dependencies between MTVs. This includes defining that all MTVs are dependent on MTV#1 of each business process. The system 204 defines that MTV#1 of a business process that requires a data set is dependent on the MTV#1 of the business process that creates that data set. The system 204 defines that MTV#X is dependent on another MTV#Y only if the value of MTV#X can only be achieved after the value of MTV#Y was already certified.

Once the system 204 defines the MTVs, the system 204 links the MTVs to the project backlog. To accomplish this, the system 204 may utilize historical information and rules (e.g. collected from development experts and solution architects/managers who scan the business processes, previous projects, any backlog item logged, machine learning, etc.) to customize the software based on the business process needs of the customer. The system 204 identifies for each development backlog item the list of MTVs which values can only be achieved if the backlog item is developed.

The system 204 identifies from the list the MTV to which the backlog item will be linked (there should be only one). Further, the system 204 removes any MTV from the list that depends directly or indirectly on other MTVs also in the list. The system 204 selects an MTV from the remaining MTVs that represents the simplest flow and has the best chance to be achieved the earliest. If in the selection of an MTV for a backlog item there were MTVs that have no dependency (directly or indirectly), the system 204 adds a dependency for each of those that were not selected to the MTV that was selected.

The system 204 may recognize that an MTV is still valuable even if it has no backlog items related to it, but the system 204 may strive to balance the backlog items between the MTVs to increase the possibility of MTV level testing with each delivered software.

If a large list of backlog items had to be related to a specific MTV, the system 204 may examine/review the MTV to determine whether there is any option to split such MTV, while still providing value for each of the MTVs produced from it. In one embodiment, the system 204 may accomplish this using various rules present in the repositories/databases 208.

It is expected that MTV#1 of each business process will contain more backlog items because foundation backlog items will be linked to it, but rules implemented by the system 204 may focus on avoiding foundation items and producing a backlog that carries business value.

Once the system 204 links the MTVs to the backlog, the system 204 confirms the MTVs during a backlog confirmation stage. To accomplish this, the system 204 organizes the MTVs based on the business process (or group of processes that carry one combined value). In one embodiment, the system 204 may generate/build a document (e.g. a PPT, etc.) with boxes representing the MTV titles for each business process. In one embodiment, dependencies between the MTVs may be reflected as arrows pointing from one MTV title to another. The system 204 may add additional information (e.g. slides, etc.) to the document showing the list of backlog items related to each MTV title.

Utilizing this document, which in one embodiment the system 204 may publish to multiple groups, operators may review with the customer the list of MTVs and the lists of backlog items for each MTV before reviewing the business process, thus allowing the customer to understand the scope of the project and relationship to the correct element in the business process.

The system 204 may collect/log customer feedback (e.g. input by the customers, etc.) on the MTVs and backlog items needed to achieve the MTVs. If an added value is raised by the customer which is not achieved by any of the MTVs, the system 204 may add an additional MTV to cover that value. If a value an MTV is meant to achieve is stated by the customer as not relevant for a business, the system 204 may remove the MTV. If the customer specifies one value cannot be achieved without also achieving another, or that only together they represent real business value, the system 204 may merge the two MTVs. If a customer raises additional sub values that can be achieved within the scope of a single MTV, the system 204 may split the MTV so each business value the customer identified is covered by one MTV and may assign the link to the backlog items so all previously linked backlog items to the original MTV are linked to one of the new MTVs.

Further, the system 204 will maintain MTVs during backlog grooming. Thus, the system 204 may be utilized during backlog grooming sessions. When backlog items are modified as a result of grooming, the system 204 may verify that the MTV they are linked to is still achievable and, if needed, the system 204 may modify the MTV to represent the new value the customer expects to achieve.

When backlog items are removed as result of grooming, the system 204 may verify that the MTV they are linked to is still required and achievable. If it is no longer required (e.g. the value for it is no longer expected by the customer, etc.), the system 204 may remove the MTV. If it is required but not achievable, the system 204 may raise the gap and verify that a new backlog item is provided to support the required value.

When backlog items are added as result of grooming, the system 204 may search in the existing list of MTVs for the MTV with a value that can only be achieved if the backlog item is developed. If one exists, the system 204 may link the backlog item to it. On the other hand, if the backlog item does not provide a standalone new value, but only supports the existing business values, the system 204 may identify an MTV that the backlog item supports and link the two. The system 204 may select one that does not have a large list of backlog items already linked to it. On the other hand, if the backlog item does provide standalone new value, the system 204 may define a new MTV for the new value that was identified and link the backlog item to it.

In any case in which a new MTV was raised or an MTV was removed, the system 204 may send an alert to the resource in the project responsible for the business process that an item was raised/removed that requires modification to the business process. The system 204 may ensure that each backlog item has one MTV linked to it, where no backlog item is allowed to remain unlinked to an MTV and no backlog item can have more than one MTV linked to it.

The system 204 may also certify or help certify MTVs after each delivery of software. For example, the system 204 may utilize the list of MTVs to design tests for the flow represented by the MTV, with the focus on the value the MTV is designed to provide, while covering any test data parameters that were not included in the business parameters for which MTVs were split. The system 204 may identify the list of backlog items that were delivered in the software delivery and also identify the list of MTVs for which the complete set of backlog items linked to them has been delivered.

The system 204 may run all test flows designed by the testing team for the MTV. In one embodiment, execution of the tests may include automation of the tests that passed successfully. The system 204 may identify and request or generate fixes for any defects identified during the tests. The system 204 may rerun any test that failed after fixes were provided. Further, the system 204 may identify a regression set, which may be automated, for the MTV.

The system 204 may define the MTV as certified if a defined quality has achieved the criteria set by the customer for delivered software. The system 204 may merge in to the overall regression of the project the tests identified as regression, and the tests may be automated at this point.

Utilization of MTVs allows and drives the backlog to include meaningful features as an end-to-end process, allowing development factories to work as cross function teams, hence removing siloes. Additionally, MTV use offers a unique advantage in multi-vendor environments and enables alignment of all stakeholders' development into similar timelines, hence reducing time to market.

MTVs function as integrated scope elements that can be tested end-to-end and incorporate internal capabilities of communication service providers, as well as required third party capabilities. The same list of MTVs may be reviewed during scoping (or iterative scoping) with customers, solution teams, product owners, and may be translated into a backlog of EPICs and features.

Figure 3:
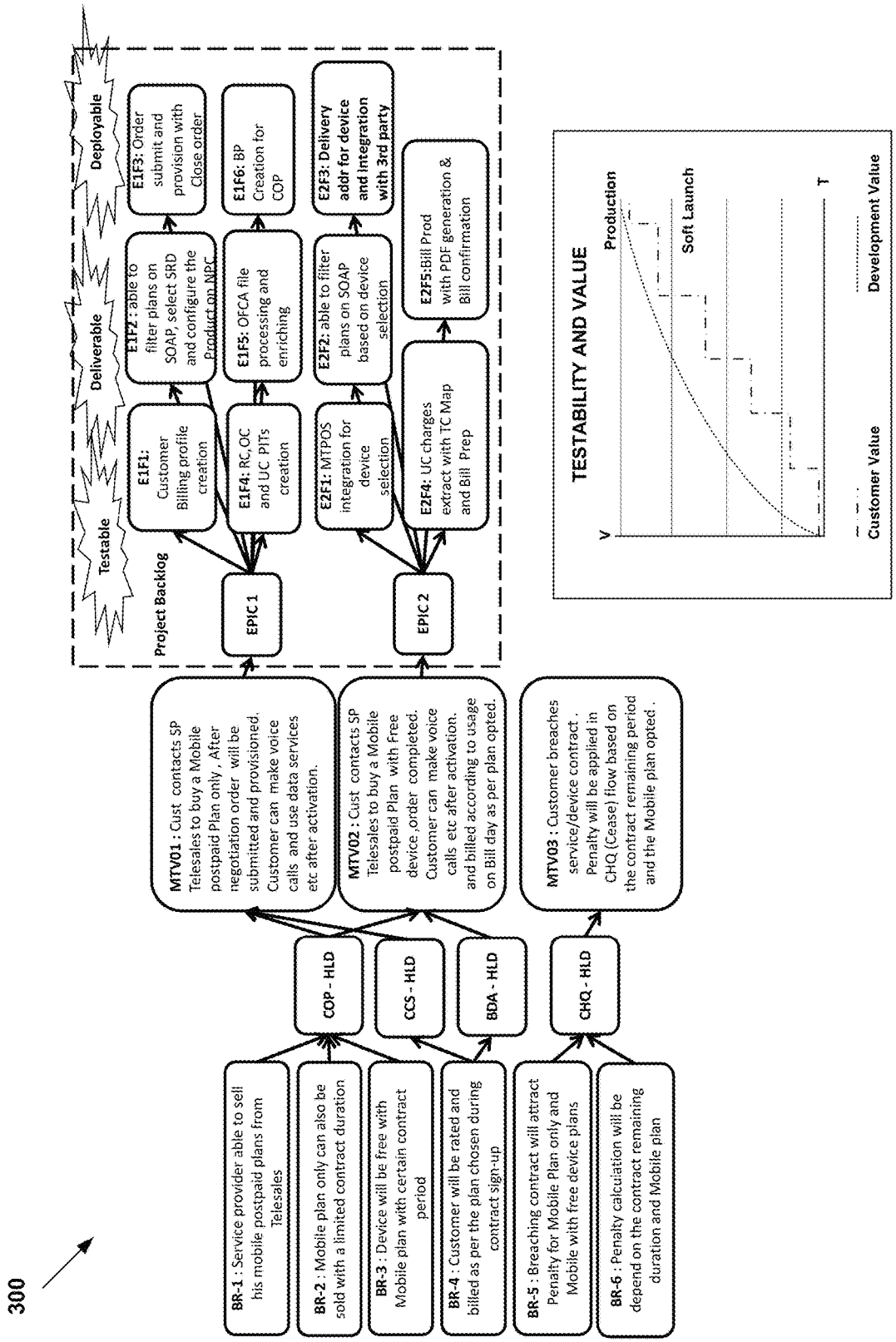
FIG. 3 shows an example of generating and utilizing MTVs, in accordance with one embodiment.

FIG. 3 shows an example 300 of generating and utilizing MTVs, in accordance with one embodiment. As an option, the example 300 may be implemented in the context of the details of the previous figures and/or any subsequent figure(s). Of course, however, the example 300 may be implemented in the context of any desired environment. Further, the aforementioned definitions may equally apply to the description below.

As shown, a system identifies a plurality of business processes/scenarios, including: BR-1—service provider able to sell his mobile postpaid plans from Telesales; BR-2—mobile plan only can also be sold with a limited contract duration; BR-3—device will be free with mobile plan with certain contract period; BR-4—customer will be rated and billed as per the plan chosen during contract sign-up; BR-5—breaching contract will attract penalty for mobile plan only and mobile with free device plans; and BR-6—penalty calculation will be dependent on the contract remaining duration and mobile plan.

Given these business processes/scenarios, as an example, the system may identify/define three MTVs (MTV01, MTV02, and MTV03). MTV01 may be defined as: Customer contacts SP Telesales to buy a mobile postpaid plan only. After negotiation, order will be submitted and provisioned. Customer can make voice calls and use data services, etc., after activation.

MTV02 may be defined as: Customer contacts SP Telesales to buy a mobile postpaid plan with free device, order completed. Customer can make voice calls, etc., after activation, and billed according to usage on bill day as per plan opted.

MTV03 may be defined as: Customer breaches service/device contract. Penalty will be applied in CHQ (cease) flow based on the contract remaining period and the mobile plan opted.

Figure 4:
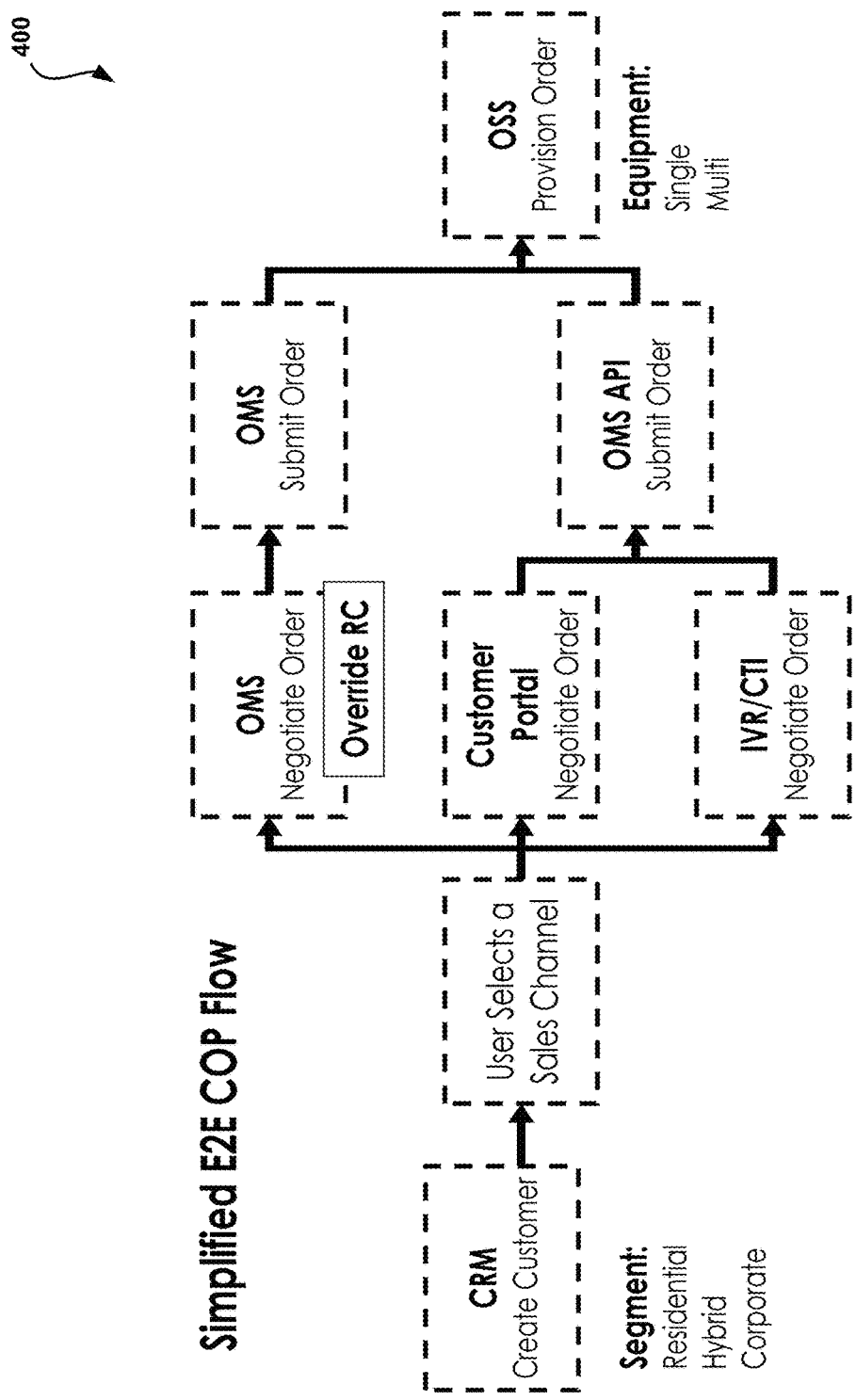
FIG. 4 shows an example of a simplified end to end COP flow from which an MTV list may be defined, in accordance with one embodiment.

FIG. 4 shows an example 400 of a simplified end to end COP flow from which an MTV list may be defined, in accordance with one embodiment. As an option, the example 400 may be implemented in the context of the details of the previous figures and/or any subsequent figure(s). Of course, however, the example 400 may be implemented in the context of any desired environment. Further, the aforementioned definitions may equally apply to the description below.

As an example, a system may generate an MTV from the end-to-end COP flow of FIG. 4. The system may identify the critical path in the business process and define this critical path as the first MTV.

Figure 5:
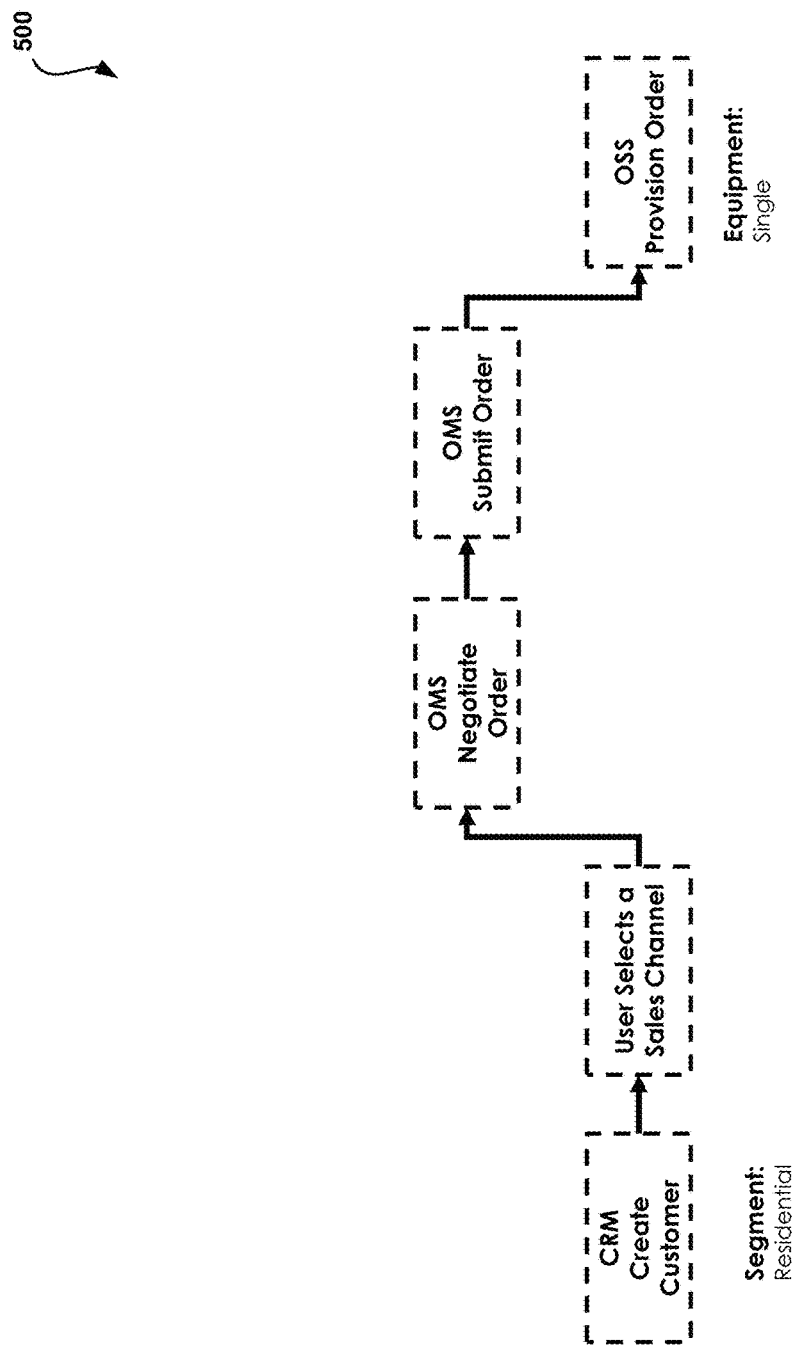
FIG. 5 shows an example of an MTV generated from the flow of FIG. 4, in accordance with one embodiment.

FIG. 5 shows an example 500 of an MTV generated from the flow of FIG. 4, in accordance with one embodiment. As an option, the example 500 may be implemented in the context of the details of the previous figures and/or any subsequent figure(s). Of course, however, the example 500 may be implemented in the context of any desired environment. Further, the aforementioned definitions may equally apply to the description below.

Figure 6:
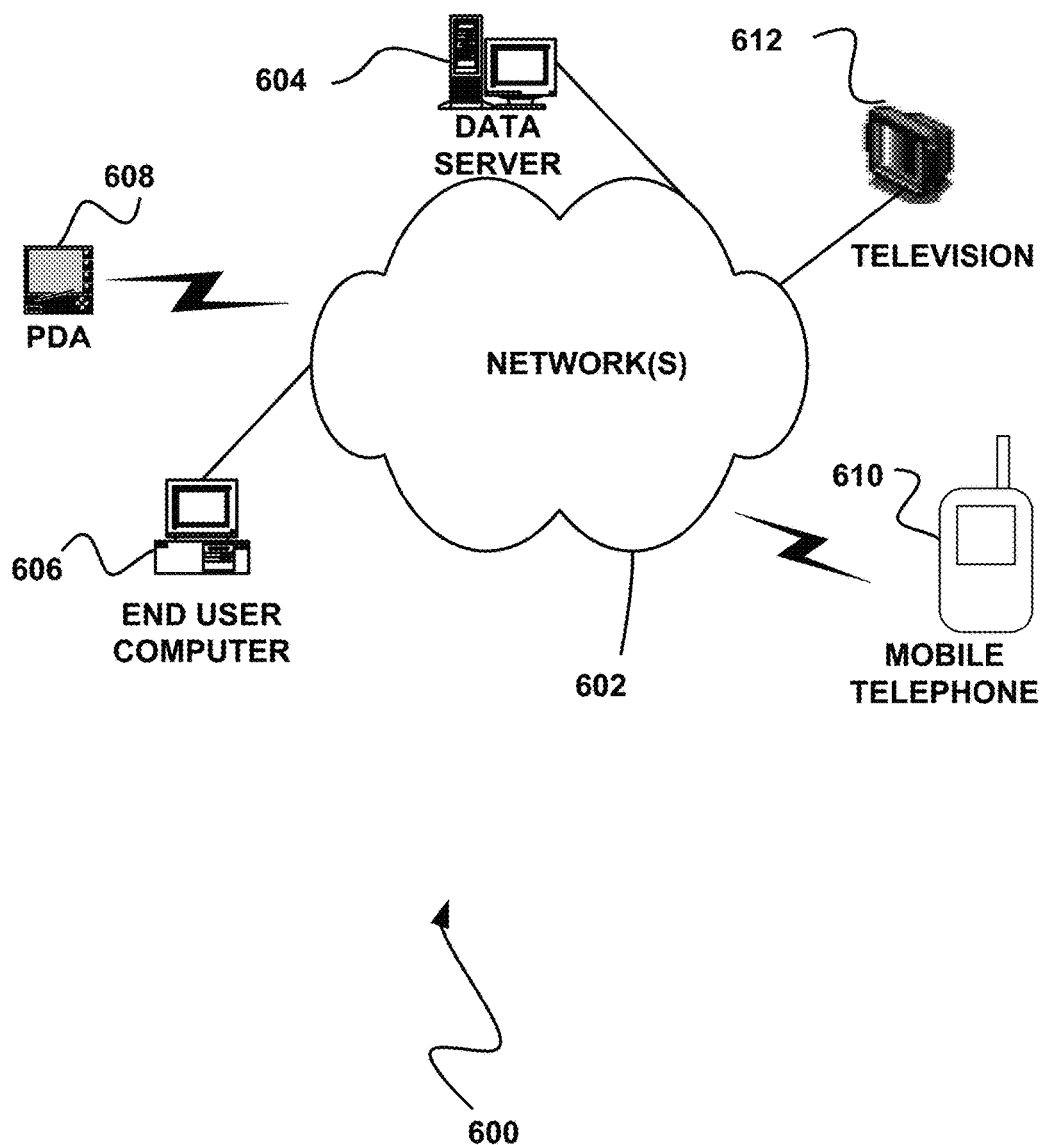
FIG. 6 illustrates a network architecture, in accordance with one possible embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc.

Figure 7:
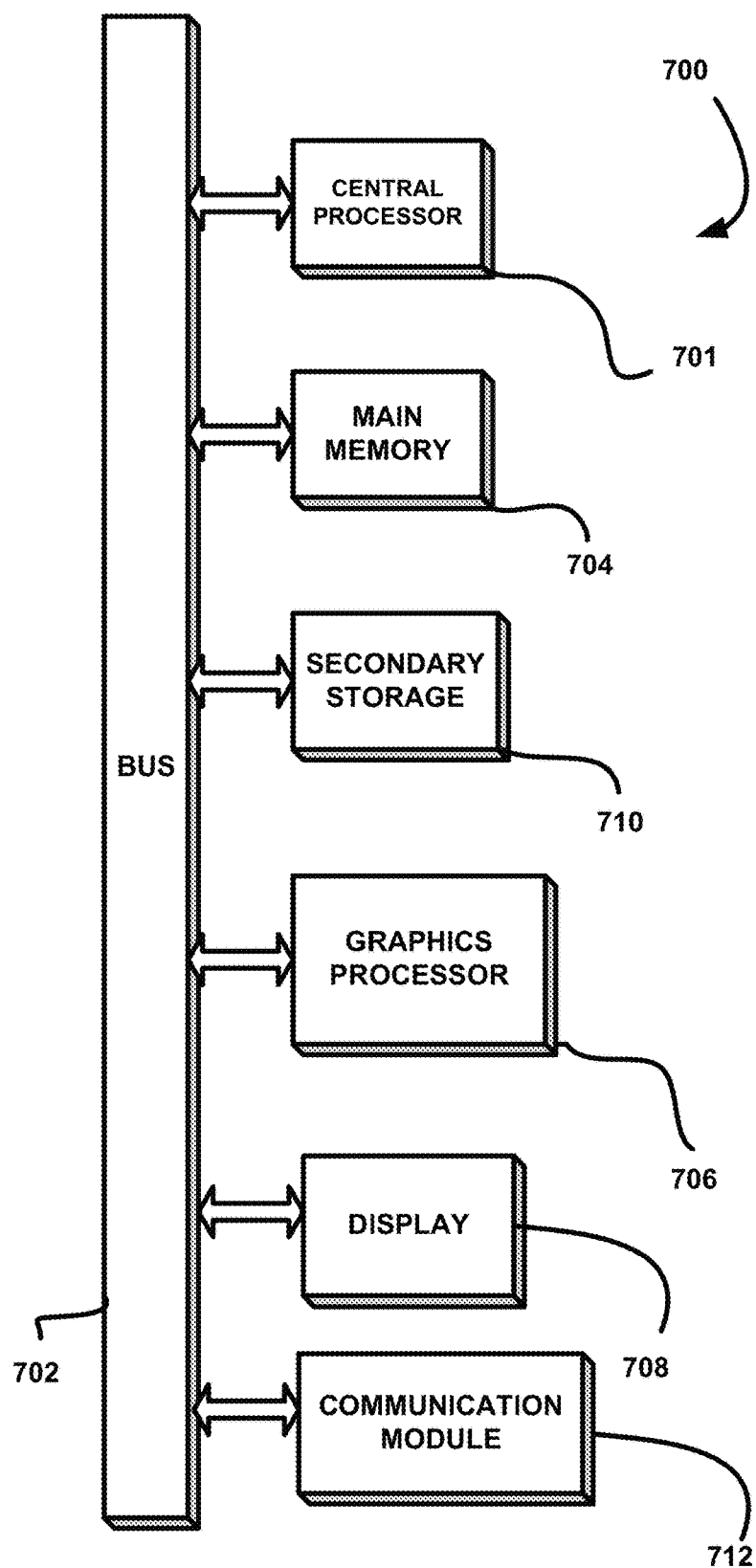
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 708.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of non-transitory computer-readable media.

The system 700 may also include one or more communication modules 712. The communication module 712 may be operable to facilitate communication between the system 700 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
identifying, by a system, a software development project;
determining, by the system, a scope of the software development project;
during a backlog definition stage associated with a project backlog corresponding to the software development project:
examining, by the system, the scope of the software development project for one or more business processes,
automatically determining, by the system, a critical path in the one or more business processes, the critical path including only mandatory actions and being determined utilizing historical data and rules,
automatically determining, by the system, each path extending from a decision point in the one or more business processes,
defining, by the system, a plurality of minimal testable values (MTVs) including the critical path as a first MTV, and the determined paths as additional MTVs, and
responsive to defining the plurality of MTVs, linking, by the system, the MTVs to items in the project backlog, wherein each item in the project backlog is linked to one of the MTVs, by:
identifying, for the item in the project backlog, a list of MTVs from the plurality of MTVs having values that can only be achieved when the item in the project backlog is developed,
removing any MTV from the list that depends directly or indirectly on at least one other MTV on the list to create an updated list, and
selecting an MTV from MTVs on the updated list which represents a simplest flow and has the best chance to be achieved the earliest,
linking the selected MTV to the item in the project backlog, and
creating a dependency between the selected MTV and each remaining MTV on the updated list;
confirming, by the system, the MTVs as part of a backlog confirmation stage associated with the software development project by:
organizing, in a document, the MTVs based on business process, and
publishing the document to one or more users to present a scope of the software development project to the one or more users;
maintaining, by the system, the MTVs during a backlog grooming stage associated with the software development project, including:
for a first backlog item of the project backlog that is removed from the project backlog, verifying that a new backlog item is provided to support one or more of the MTVs linked to the first backlog item; and
certifying, by the system, the MTVs after each delivery of software associated with the software development project, including for each delivery of software:
identifying a subset of the items in the backlog delivered in the delivery of software, identifying a subset of the MTVs linked to the subset of the items in the backlog, designing tests for a flow represented by each of the MTVs in the subset, executing the tests, and generating fixes for any defects identified during the execution of the tests, re-executing a subset of the tests associated with the defects after providing the fixes, certifying each MTV in the subset of MTVs when associated criteria for the software is achieved.

2. The method of claim 1, wherein the system associates the additional MTVs with the first MTV.

3. The method of claim 2, wherein the system identifies dependencies between the additional MTVs.

4. The method of claim 3, wherein the system identifies dependencies between the additional MTVs by organizing the additional MTVs based on the one or more business processes.

5. A computer program product embodied on a non-transitory computer readable medium, comprising computer code for:

identifying, by a system, a software development project;

determining, by the system, a scope of the software development project;

during a backlog definition stage associated with a project backlog corresponding to the software development project:

examining, by the system, the scope of the software development project for one or more business processes, automatically determining, by the system, a critical path in the one or more business processes, the critical path including only mandatory actions and being determined utilizing historical data and rules, automatically determining, by the system, each path extending from a decision point in the one or more business processes, defining, by the system, a plurality of minimal testable values (MTVs) including the critical path as a first MTV, and the determined paths as additional MTVs, and responsive to defining the plurality of MTVs, linking, by the system, the MTVs to items in the project backlog, wherein each item in the project backlog is linked to one of the MTVs, by:

identifying, for the item in the project backlog, a list of MTVs from the plurality of MTVs having values that can only be achieved when the item in the project backlog is developed, removing any MTV from the list that depends directly or indirectly on at least one other MTV on the list to create an updated list, and selecting an MTV from MTVs on the updated list which represents a simplest flow and has the best chance to be achieved the earliest, linking the selected MTV to the item in the project backlog, and creating a dependency between the selected MTV and each remaining MTV on the updated list;

confirming, by the system, the MTVs as part of a backlog confirmation stage associated with the software development project by:

organizing, in a document, the MTVs based on business process, and publishing the document to one or more users to present a scope of the software development project to the one or more users;

maintaining, by the system, the MTVs during a backlog grooming stage associated with the software development project, including:

for a first backlog item of the project backlog that is removed from the project backlog, verifying that a new backlog item is provided to support one or more of the MTVs linked to the first backlog item; and certifying, by the system, the MTVs after each delivery of software associated with the software development project, including for each delivery of software:

identifying a subset of the items in the backlog delivered in the delivery of software, identifying a subset of the MTVs linked to the subset of the items in the backlog, designing tests for a flow represented by each of the MTVs in the subset, executing the tests, and generating fixes for any defects identified during the execution of the tests, re-executing a subset of the tests associated with the defects after providing the fixes, certifying each MTV in the subset of MTVs when associated criteria for the software is achieved.

6. The computer program product of claim 5, wherein the system associates the additional MTVs with the first MTV.

7. The computer program product of claim 6, wherein the system identifies dependencies between the additional MTVs.

8. The computer program product of claim 7, wherein the system identifies dependencies between the additional MTVs by organizing the additional MTVs based on the one or more business processes.

9. A system, comprising one or more processors, operable for:

identifying, by the system, a software development project;

determining, by the system, a scope of the software development project;

during a backlog definition stage associated with a project backlog corresponding to the software development project:

examining, by the system, the scope of the software development project for one or more business processes, automatically determining, by the system, a critical path in the one or more business processes, the critical path including only mandatory actions and being determined utilizing historical data and rules, automatically determining, by the system, each path extending from a decision point in the one or more business processes, defining, by the system, a plurality of minimal testable values (MTVs) including the critical path as a first MTV, and the determined paths as additional MTVs, and responsive to defining the plurality of MTVs, linking, by the system, the MTVs to items in the project backlog, wherein each item in the project backlog is linked to one of the MTVs, by:

identifying, for the item in the project backlog, a list of MTVs from the plurality of MTVs having values that can only be achieved when the item in the project backlog is developed, removing any MTV from the list that depends directly or indirectly on at least one other MTV on the list to create an updated list, and selecting an MTV from MTVs on the updated list which represents a simplest flow and has the best chance to be achieved the earliest, linking the selected MTV to the item in the project backlog, and creating a dependency between the selected MTV and each remaining MTV on the updated list;

confirming, by the system, the MTVs as part of a backlog confirmation stage associated with the software development project by:

organizing, in a document, the MTVs based on business process, and publishing the document to one or more users to present a scope of the software development project to the one or more users;

maintaining, by the system, the MTVs during a backlog grooming stage associated with the software development project, including:

for a first backlog item of the project backlog that is removed from the project backlog, verifying that a new backlog item is provided to support one or more of the MTVs linked to the first backlog item; and certifying, by the system, the MTVs after each delivery of software associated with the software development project, including for each delivery of software:

identifying a subset of the items in the backlog delivered in the delivery of software, identifying a subset of the MTVs linked to the subset of the items in the backlog, designing tests for a flow represented by each of the MTVs in the subset, executing the tests, and generating fixes for any defects identified during the execution of the tests, re-executing a subset of the tests associated with the defects after providing the fixes, certifying each MTV in the subset of MTVs when associated criteria for the software is achieved.

10. The system of claim 9, wherein the system associates the additional MTVs with the first MTV.

11. The system of claim 10, wherein the system identifies dependencies between the additional MTVs.

\* \* \* \* \*